No. 678,067.   
G. TOBLER.  
WHEEL FOR VEHICLES.  
(Application filed Mar. 23, 1901.)  
Patented July 9, 1901.

(No Model.)

2 Sheets—Sheet 1.

WITNESSES:

INVENTOR  
Gustav Tobler  
BY  
ATTORNEYS

No. 678,067.

G. TOBLER.

WHEEL FOR VEHICLES.

(Application filed Mar. 23, 1901.)

Patented July 9, 1901.

(No Model.)

2 Sheets—Sheet 2.

WITNESSES:

INVENTOR

Gustav Tobler

BY Richards & Co

ATTORNEYS

UNITED STATES PATENT OFFICE.

GUSTAV TOBLER, OF BERLIN, GERMANY.

WHEEL FOR VEHICLES.

SPECIFICATION forming part of Letters Patent No. 678,067, dated July 9, 1901.

Application filed March 23, 1901. Serial No. 52,522. (No model.)

*To all whom it may concern:*

Be it known that I, GUSTAV TOBLER, a subject of the King of Prussia, German Emperor, residing at Berlin, Province of Brandenburgh, Kingdom of Prussia, Germany, have invented new and useful Improvements in Wheels for Vehicles, of which the following is a full specification.

My invention has for its object an improved wheel which in its various forms of construction is suitable for all kinds of vehicles.

The characteristic feature of this improved wheel consists in a separate closed ring being elastically connected with the otherwise rigid wheel-body in such a way that said ring always yields toward the wheel hub or center from the point where it bears on the track. According to the form given to the outer periphery of the ring this improved wheel may be advantageously employed for various vehicles.

In the accompanying drawings two forms of construction of the wheel are shown.

Figure 1:
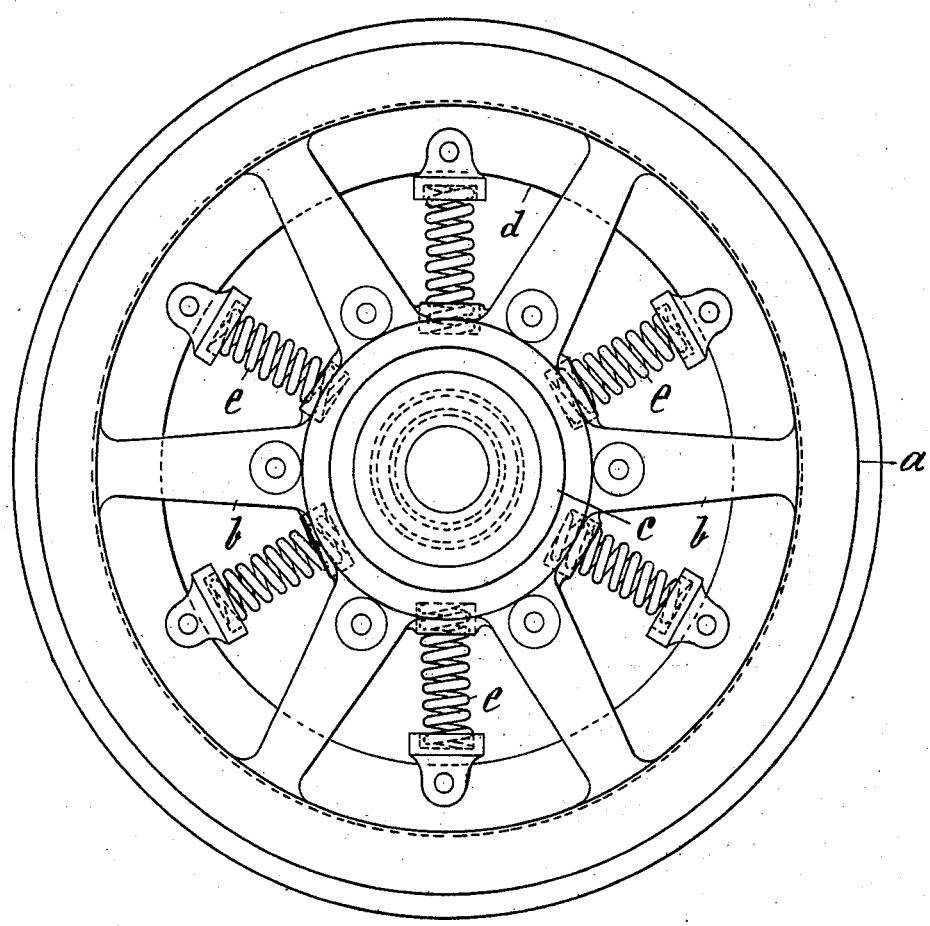
Figure 2:
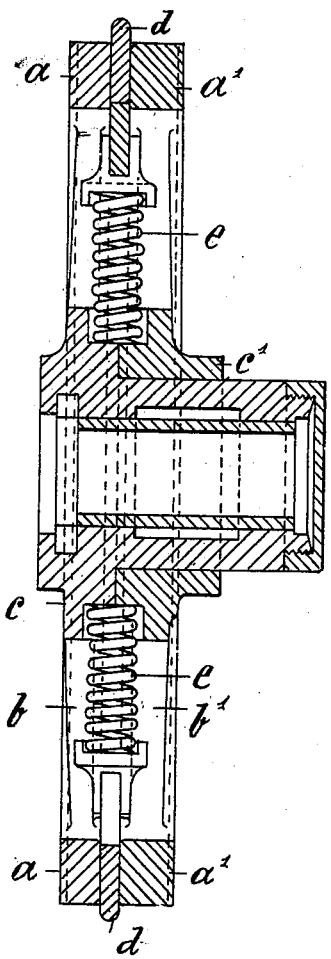

Figure 1 is an elevation; Fig. 2, a cross-section of one form of construction, and Fig. 3 a cross-section of another form of construction.

The body of the wheel, comprising rim $a$ $a'$, spokes $b$ $b'$, and hub $c$ $c'$, is shown formed of two parts. Of course it may be made in any other suitable manner. In an unloaded condition the ring $d$ or D sits concentrically to the wheel-body and is connected with the solid wheel-body by means of strong springs $e$. In the form of construction shown in Fig. 2 the ring $d$ is slightly tapered and rounded at its outer periphery. This form of construction provides a wheel preferably employed for vehicles of all kinds which are intended to run both on rails and on ordinary roads. When a vehicle provided with such wheels travels on rails, the rim $a$ or $a'$ runs on the rails, while the part of the ring $d$ which in this case projects evenly all around acts as the flange or fin. When a vehicle provided with such wheels travels on an ordinary road, the part of the ring $d$ which is at any time in contact with the ground is forced inward toward the wheel-hub, so that the vehicle can thus run with the rim $a$ $a'$ on the ground.

Figure 3:
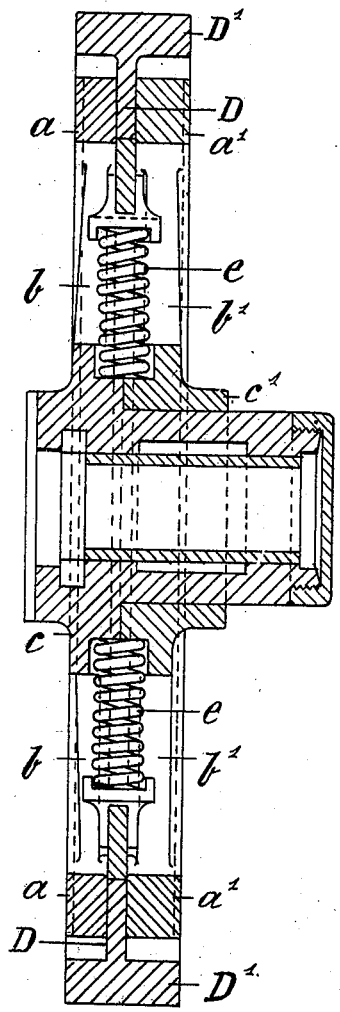

In the form of construction shown in Fig. 3 the ring D, which is otherwise arranged precisely as in the previously-described wheel, has a broad flanged tire D', which may be formed in various ways—for instance, may also be provided with a cushion-tire. This wheel is suitable for all kinds of street-vehicles. At the place precisely which rests on the ground the ring or tire D D' is forced back toward the center of the wheel against the pressure of the springs provided, and thus enables the vehicle to travel free from vibration.

What I claim is—

1. A wheel comprising a rigid body having a groove or channel in the rim thereof and a rigid tread or flange yieldingly guided in said channel, substantially as described.

2. A wheel comprising a rigid hub and rim, a channel opening through said rim, a rigid supplemental rim or tread guided in said channel and springs interposed between said supplemental rim and the hub, substantially as described.

In witness whereof I have hereunto set my hand in presence of two witnesses.

GUSTAV TOBLER.

Witnesses:
WOLDEMAR HAUPT,
HENRY HASPER.